US011940133B2

(12) United States Patent
Ross et al.

(10) Patent No.: US 11,940,133 B2
(45) **Date of Patent: *Mar. 26, 2024**

(54) FRAME WITH CLIP AND LOCKING WIRE

(71) Applicant: First-Light USA, LLC, Seymour, IL (US)

(72) Inventors: Jeremy B. Ross, Monticello, IL (US); Blake S. Good, Urbana, IL (US); Jacob A. Flagle, New Palestine, IN (US)

(73) Assignee: First-Light USA, LLC, Seymour, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,832

(22) Filed: Dec. 5, 2022

(65) Prior Publication Data

US 2024/0019109 A1 Jan. 18, 2024

Related U.S. Application Data

(63) Continuation of application No. 17/819,270, filed on Aug. 11, 2022, now Pat. No. 11,592,163, which is a (Continued)

(51) Int. Cl.

*F21V 21/088* (2006.01)
*F21L 4/02* (2006.01)

(Continued)

(52) U.S. Cl.

CPC .......... *F21V 21/0885* (2013.01); *F21L 4/027* (2013.01); *F21L 4/045* (2013.01); *F21V 21/145* (2013.01); *F21W 2111/10* (2013.01)

(58) Field of Classification Search

CPC ...... F21V 21/0885; F21V 21/088; F21L 4/04; F21L 4/045

See application file for complete search history.

(56) References Cited

U.S. PATENT DOCUMENTS 2,539,974 A 1/1951 Riddell
5,056,696 A 10/1991 Lahr (Continued)

FOREIGN PATENT DOCUMENTS

CN 203656591 U 6/2014

OTHER PUBLICATIONS

International Search Report and Written Opinion dated Feb. 12, 2019, from the ISA/US, for International Application No. PCT/US18/62773 (filed Nov. 28, 2018), 10 pgs.

(Continued)

*Primary Examiner* — William N Harris
(74) *Attorney, Agent, or Firm* — Ascenda Law Group, PC

(57) ABSTRACT

A frame having a clip for securing the frame to an article of clothing or other object. The frame includes a mount for receiving a removable module and a rotatably attached clip. The clip includes an opening for accommodating sewing ribs between portions of a webbing and a gate (which may be a locking wire) moveable between an open position and a closed position at one end of the opening. In the open position, the locking wire removably engages one of a pair of elongated members defining the opening, e.g., by removably engaging that elongated member at a recess in an outside edge thereof, and does not obstruct the opening. When in the closed position, the locking wire removably engages the other of the elongated members, for example by removably engaging that other elongated member at a recess in its outside edge, and obstructs the longitudinal opening.

20 Claims, 14 Drawing Sheets

Related U.S. Application Data continuation of application No. 17/649,055, filed on Jan. 26, 2022, now Pat. No. 11,480,321, which is a continuation of application No. 16/983,252, filed on Aug. 3, 2020, now Pat. No. 11,287,117.

(51) Int. Cl.

| | |
|---|---|
| ***F21L 4/04*** | (2006.01) |
| ***F21V 21/14*** | (2006.01) |
| ***F21W 111/10*** | (2006.01) |

(56) References Cited

U.S. PATENT DOCUMENTS

| | | | | |
|---|---|---|---|---|
| 5,083,246 | A | 1/1992 | Lambert | |
| 5,183,324 | A | 2/1993 | Thomas | |
| 5,460,346 | A * | 10/1995 | Hirsch | A45F 5/02 248/231.51 |
| 6,224,235 | B1 | 5/2001 | Parker | |
| 6,481,869 | B1 | 11/2002 | Horandel et al. | |
| 6,604,837 | B2 | 8/2003 | Sandberg | |
| 6,619,813 | B1 | 9/2003 | Schnell | |
| 6,695,269 | B1 | 2/2004 | Anscher | |
| 6,953,259 | B2 | 10/2005 | Parsons et al. | |
| 7,185,997 | B2 | 3/2007 | Simoni | |
| 7,234,831 | B1 * | 6/2007 | Hanley | A42B 1/244 2/209.13 |
| 8,851,697 | B2 | 10/2014 | Quitner | |
| 9,366,419 | B2 | 6/2016 | Osborn | |
| 9,732,948 | B1 | 8/2017 | Malina et al. | |
| 10,465,887 | B1 | 11/2019 | Levy et al. | |
| 10,670,201 | B1 | 6/2020 | Noble | |
| 10,716,350 | B2 | 7/2020 | Waters | |
| 10,995,940 | B2 | 5/2021 | Kaye | |
| 11,215,330 | B1 * | 1/2022 | Ross | F21L 4/022 |
| 11,478,035 | B2 | 10/2022 | Waters | |
| 2004/0246706 | A1 | 12/2004 | Simoni | |
| 2005/0094385 | A1 | 5/2005 | Lee | |
| 2006/0087833 | A1 | 4/2006 | Simoni | |
| 2008/0049433 | A1 | 2/2008 | Sharrah et al. | |
| 2008/0174991 | A1 | 7/2008 | Tucker | |
| 2008/0186705 | A1 * | 8/2008 | Liu | A42B 1/244 362/249.07 |
| 2009/0027876 | A1 | 1/2009 | Yu | |
| 2009/0190333 | A1 | 7/2009 | Sohn | |
| 2010/0232147 | A1 | 9/2010 | Bryant et al. | |
| 2010/0309655 | A1 | 12/2010 | Sohn | |
| 2011/0063826 | A1 | 3/2011 | Lau | |
| 2011/0255286 | A1 | 10/2011 | Christ et al. | |
| 2012/0057331 | A1 * | 3/2012 | Janice | F21L 4/02 362/374 |
| 2013/0192961 | A1 * | 8/2013 | Waters | H01H 13/02 220/379 |
| 2015/0192282 | A1 | 7/2015 | Ormsbee et al. | |
| 2017/0163942 | A1 | 6/2017 | Teetzel | |
| 2017/0292659 | A1 | 10/2017 | Bayat | |
| 2019/0053561 | A1 | 2/2019 | Volmer | |
| 2019/0093867 | A1 | 3/2019 | Qiu | |
| 2019/0178477 | A1 | 6/2019 | Ross | |
| 2019/0261604 | A1 | 8/2019 | Solan et al. | |
| 2020/0318818 | A1 | 10/2020 | Ross | |

OTHER PUBLICATIONS

International Application No. PCT/US2018/062773 filed Nov. 28, 2018; International Preliminary Report on Patentability dated Mar. 4, 2020; IPEA/US; 15 pgs.

First-Light USA LLC, “TRS Molle Blade instruction sheet” (2 pgs.) (2014).

* cited by examiner

FRAME WITH CLIP AND LOCKING WIRE

RELATED APPLICATIONS

This is a CONTINUATION of U.S. application Ser. No. 17/819,270, filed 11 Aug. 2022, which is a CONTINUATION of U.S. application Ser. No. 17/649,055, filed 26 Jan. 2022, now U.S. Pat. No. 11,480,321, which is a CONTINUATION of U.S. application Ser. No. 16/983,252, filed 3 Aug. 2020, now U.S. Pat. No. 11,287,117, each of which is incorporated herein by reference.

STATEMENT REGARDING FEDERALLY SPONSORED RESEARCH OR DEVELOPMENT

This invention was made with government support under FA875119CA058 awarded by the Air Force Research Laboratory (DOD-USAF-AFMC). The government has certain rights in the invention.

FIELD OF THE INVENTION

The present invention relates generally to a frame, e.g., for carrying an illumination module or other module, having a clip for securing the frame to an article of clothing or other object.

BACKGROUND

Illumination devices find application in a variety of fields and activities. Such devices as are intended to be worn on the person of a user are often worn atop a wearer's head, e.g., secured by or to a strap, cradle, or helmet, etc., or positioned on or in spectacle frames, e.g., near the wearer's temples. The benefit of such head-worm illumination devices is that they leave the wearer's hands free to perform tasks other than holding the illumination device.

U.S. patent application Ser. No. 16/910,468, filed Jun. 24, 2020, and U.S. patent application Ser. No. 16/202,627, filed Nov. 28, 2018, each by the first-named inventor, commonly assigned to the present assignee, and incorporated herein by reference, describe illumination devices that include one or more light sources disposed within a housing attached to a clip adapted to receive a portion of a wearer's headdress, for example a chin strap or bill of a cap. An upper surface of the clip may be shaped to be worn under the wearer's chin and may also include a groove adapted to facilitate attachment of the illumination device to nylon or other strap-like webbing. One or more of the light sources is operable by a switch mounted on an opposite side of the housing from the clip when the clip is in a closed position, that is, when the clip rests on an upper surface of the housing. In addition to light sources, the illumination device may further include one or more imaging devices, e.g., a camera, and/or audio communication devices, e.g., a microphone.

SUMMARY OF THE INVENTION

Various embodiments of frame having a clip for securing the frame to an article of clothing or other object are described herein. The frame includes a mount for receiving and supplying power to a removable, pivotable module, and the clip is rotatably attached to the mount and rotatable through an arc of up to 360 degrees in a plane defined by a connection between the clip and the mount. The clip includes a longitudinal opening for accommodating sewing ribs between portions of a webbing and a gate (which in one embodiment is a locking wire) rotatable between an open position and a closed position at one end of said longitudinal opening.

In one embodiment, the mount supports an illumination module in complementary, bilateral pivot joints in arms of the mount. In other embodiments, different kinds of modules are supported, e.g., communication modules, audio/video player/recording modules, guidance modules, translator modules, etc. The illumination module includes a plurality of light sources, each light source independently operable via an associated one of a plurality of activation switches. Each light source may be independently operable in a plurality of operation modes via an associated one of the activation switches. And, each light source may be disposed behind a protective cover or diffuser.

The frame preferably includes a battery compartment with a screwably-mounted cover. The screwably-mounted cover may be affixed to the mount with a securing lanyard, and in one embodiment a first end of the securing lanyard by which the screwably-mounted cover is affixed to the mount is rotatably mounted to an arm of the mount at pivot joint adapted to receive the removable, pivotable module.

The clip may be rotatably attached to the mount by a pin, and the mount may include a rim over which the clip rotates. Such a rim may include a plurality of detents sized to accommodate a complementary projection of the clip as it rotates over the rim. For example, in one embodiment the rim of the mount over which the clip rotates includes four detents spaced 90 degrees from one another around the rim with the detents sized to accommodate a complementary projection of the clip as it rotates through the arc.

A further embodiment of the invention provides a clip having a base portion and a pair of elongated members, where the elongated members are folded under the base portion, thereby defining a gap configured to receive portions of a webbing. The elongated members are separated from one another by a longitudinal opening for accommodating sewing ribs between the portions of the webbing, and a gate is securably engaged to a first one of the elongated members and rotatable between an open position in which the gate does not obstruct the longitudinal opening and a closed position in which the gate obstructs said longitudinal opening. In one embodiment, the gate is a locking wire. When in its closed position, the locking wire removably engages a second one of the elongated members, for example by removably engaging the second one of the elongated members at a recess in a longitudinal outside edge of the second one of the elongated members. When in its open position, the locking wire removably engages the first one of the elongated members at a recess in a longitudinal outside edge of the first one of the elongated members. Thus, each respective one of the elongated members may include a recess in a longitudinal outside edge of the respective elongated member for removably engaging the locking wire.

Another embodiment of the invention provides an illumination device having a frame, an illumination module pivotably mounted within the frame, and a clip rotatably attached to the frame and rotatable through an arc of up to 360 degrees in a plane defined by a connection between a base portion of the clip and the frame. The clip has a pair of elongated members folded under the base portion, thereby defining a gap configured to receive portions of a webbing. The elongated members are separated from one another by a longitudinal opening for accommodating sewing ribs between the portions of the webbing, and a gate (e.g. a locking wire) securably engaged to a first one of the elongated members and rotatable between an open position in which the gate does not obstruct the longitudinal opening and a closed position in which the gate obstructs the longitudinal opening. For those instances where the gate is a locking wire, when in the closed position the locking wire may removably engage a second one of the elongated members, for example by removably engaging the second one of the elongated members at a recess in a longitudinal outside edge of the second one of the elongated members. When in the open position, the locking wire may removably engage the first one of the elongated members at a recess in a longitudinal outside edge of the first one of the elongated members. Thus, each respective one of the elongated members may include a recess in a longitudinal outside edge of the respective elongated member for removably engaging the locking wire.

In the above and other embodiments of the invention, the gate may be a locking wire, as described, or may be member that swings closed and open, or a cap that covers the two ends of the clip arms. The cap could be attached to the clip or not when it is not in use. Alternatively, the gate may be a barrel bolt latch or a chain latch.

These and further embodiments of the present invention are discussed in more detail below.

BRIEF DESCRIPTION OF THE DRAWINGS

The present invention is illustrated by way of example, and not limitation, in the figures of the accompanying drawings, in which.

DESCRIPTION

Figure 1:
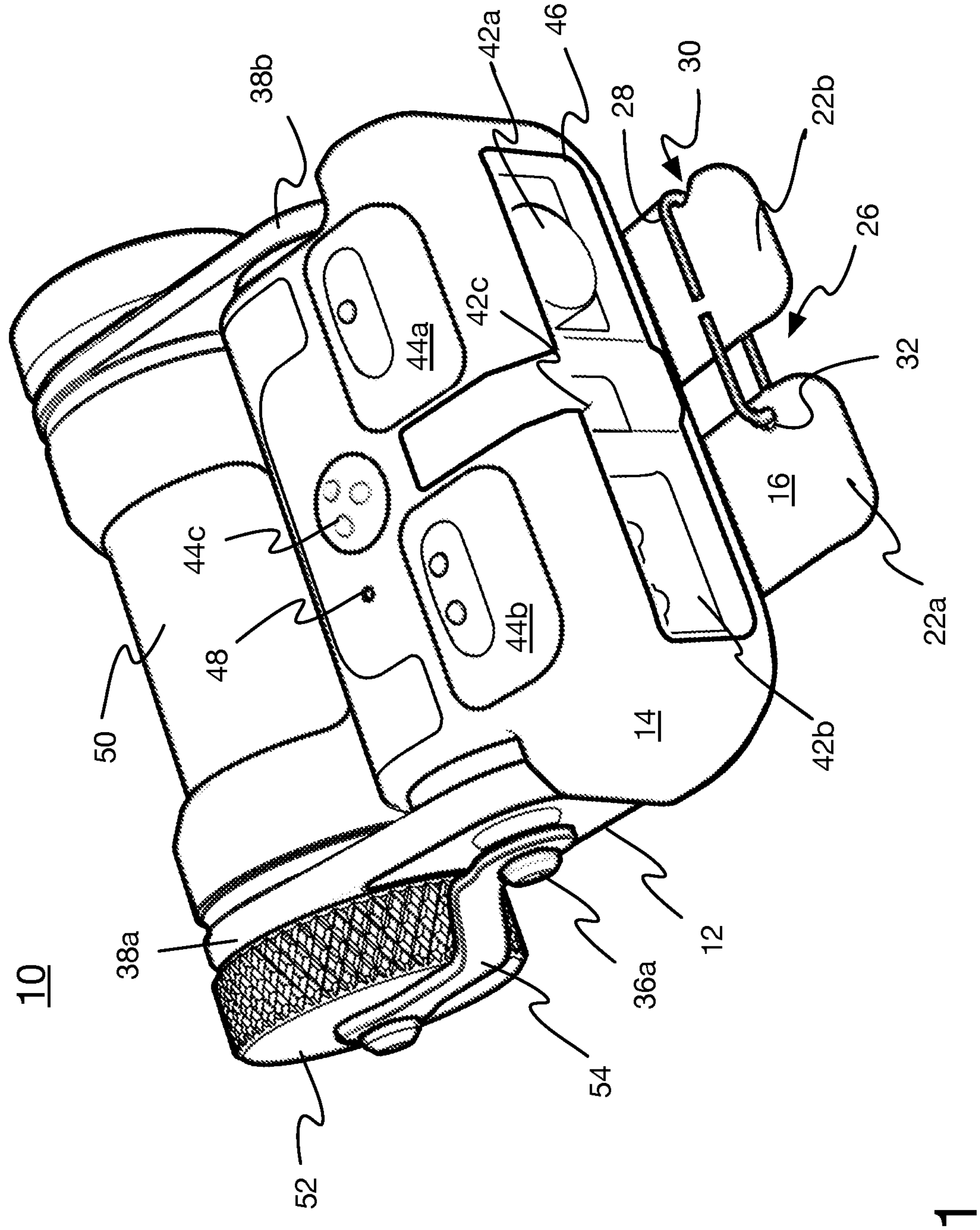
FIG. 1 illustrates a front perspective view of a frame that includes a mount for receiving and supplying power to a pivotable module and a clip rotatably attached to the frame in accordance with embodiments of the present invention.
Figure 2:
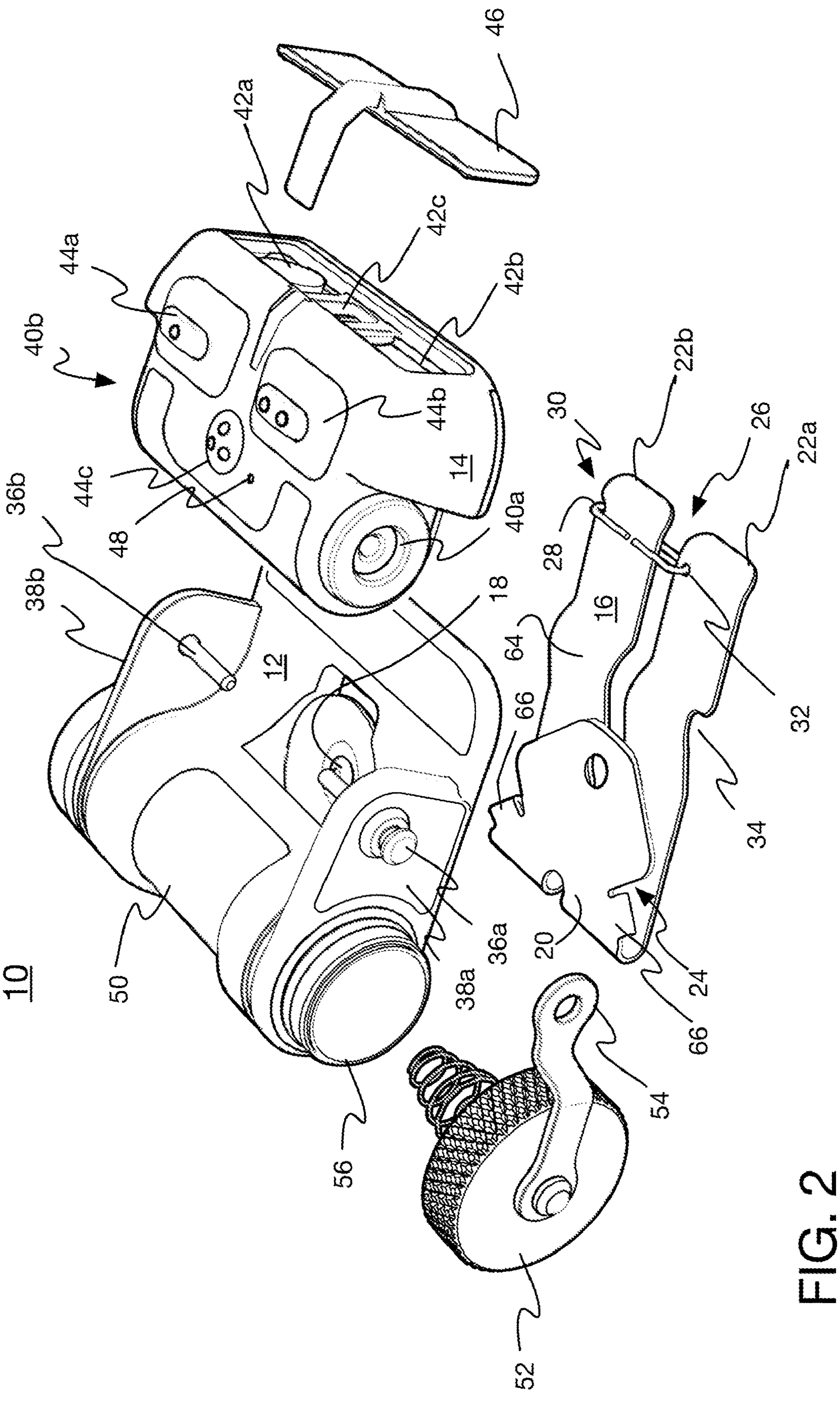
FIG. 2 is an exploded view of the frame illustrated in FIG. 1 showing the mount, the clip, and the pivotable module as well as other components.
Figure 3:
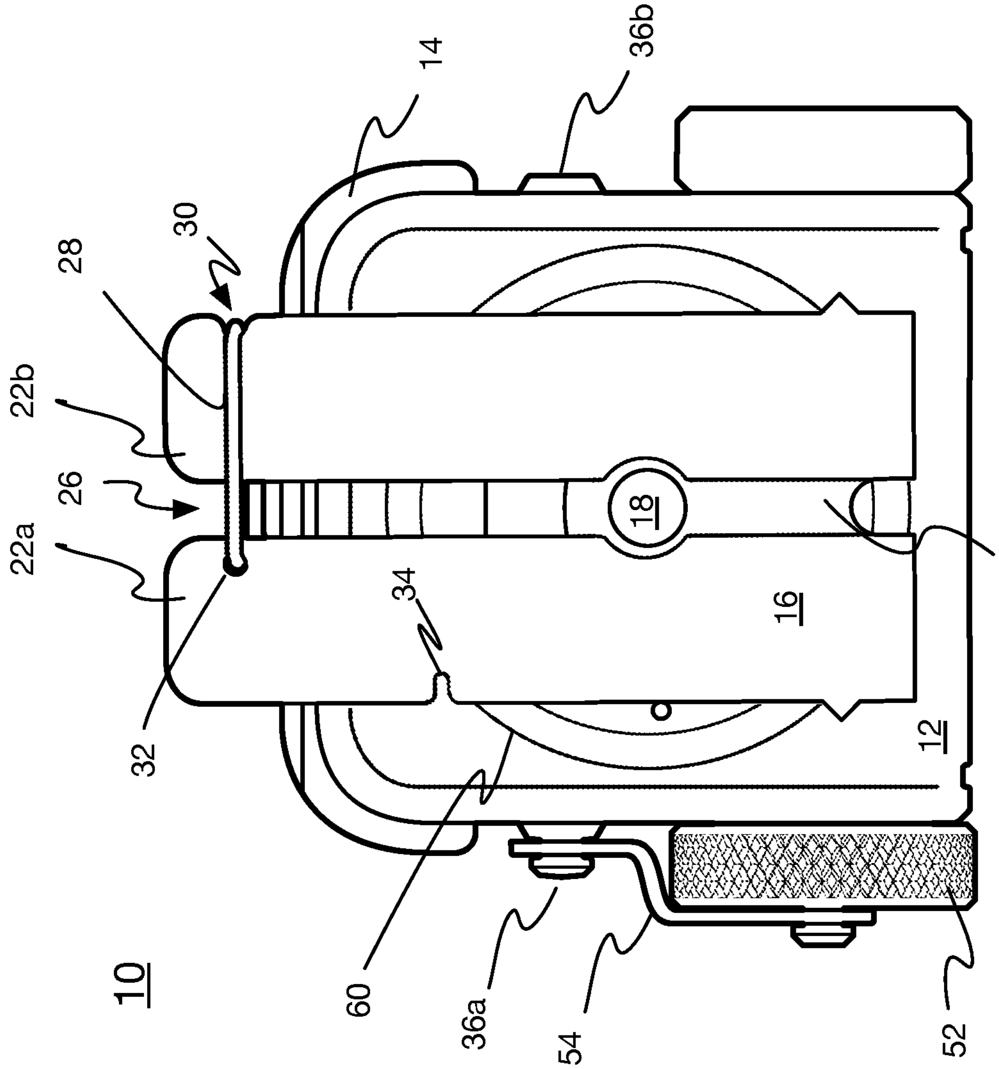
FIG. 3 is a bottom view of the frame illustrated in FIG. 1 showing a longitudinal opening in the clip for accommodating sewing ribs between portions of a webbing and a gate (in this instance a locking wire) rotatable between an open position and a closed position at one end of the longitudinal opening.
Figure 4:
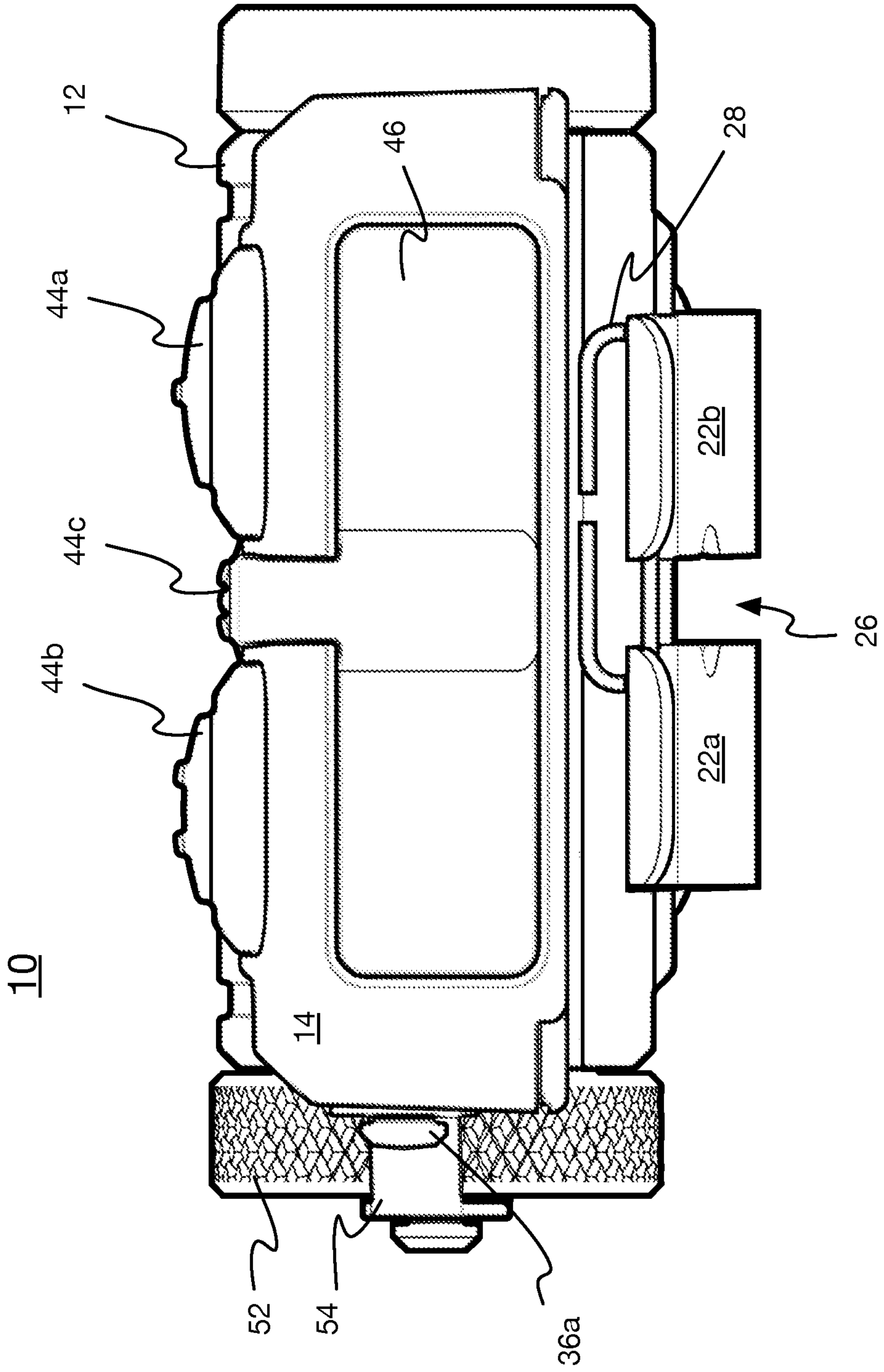
FIG. 4 is a front view of the frame illustrated in FIG. 1 showing the gate in its closed position at one end of the longitudinal opening of the clip.
Figure 5:
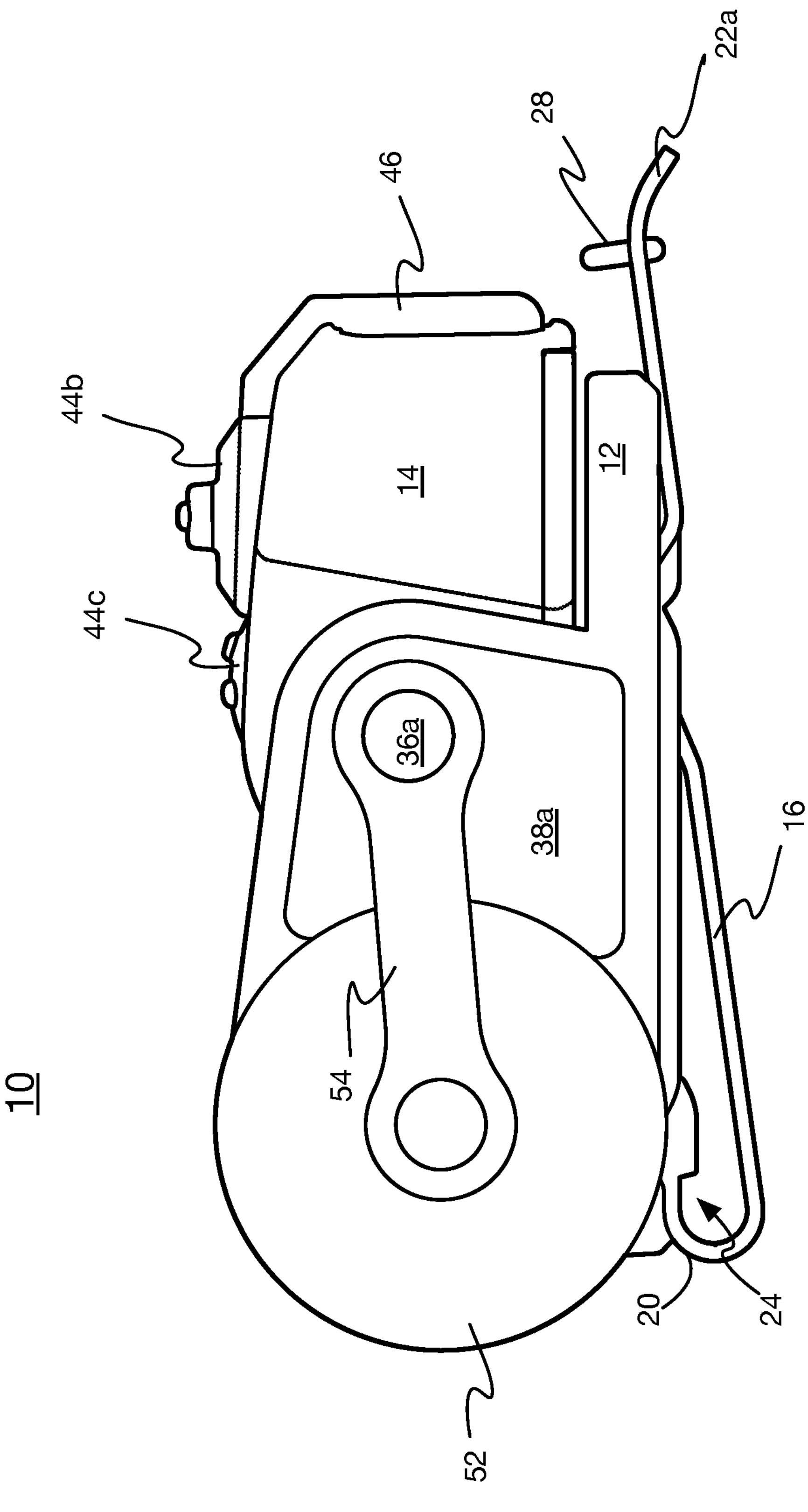
FIG. 5 is a right-side view of the frame illustrated in FIG. 1.
Figure 6:
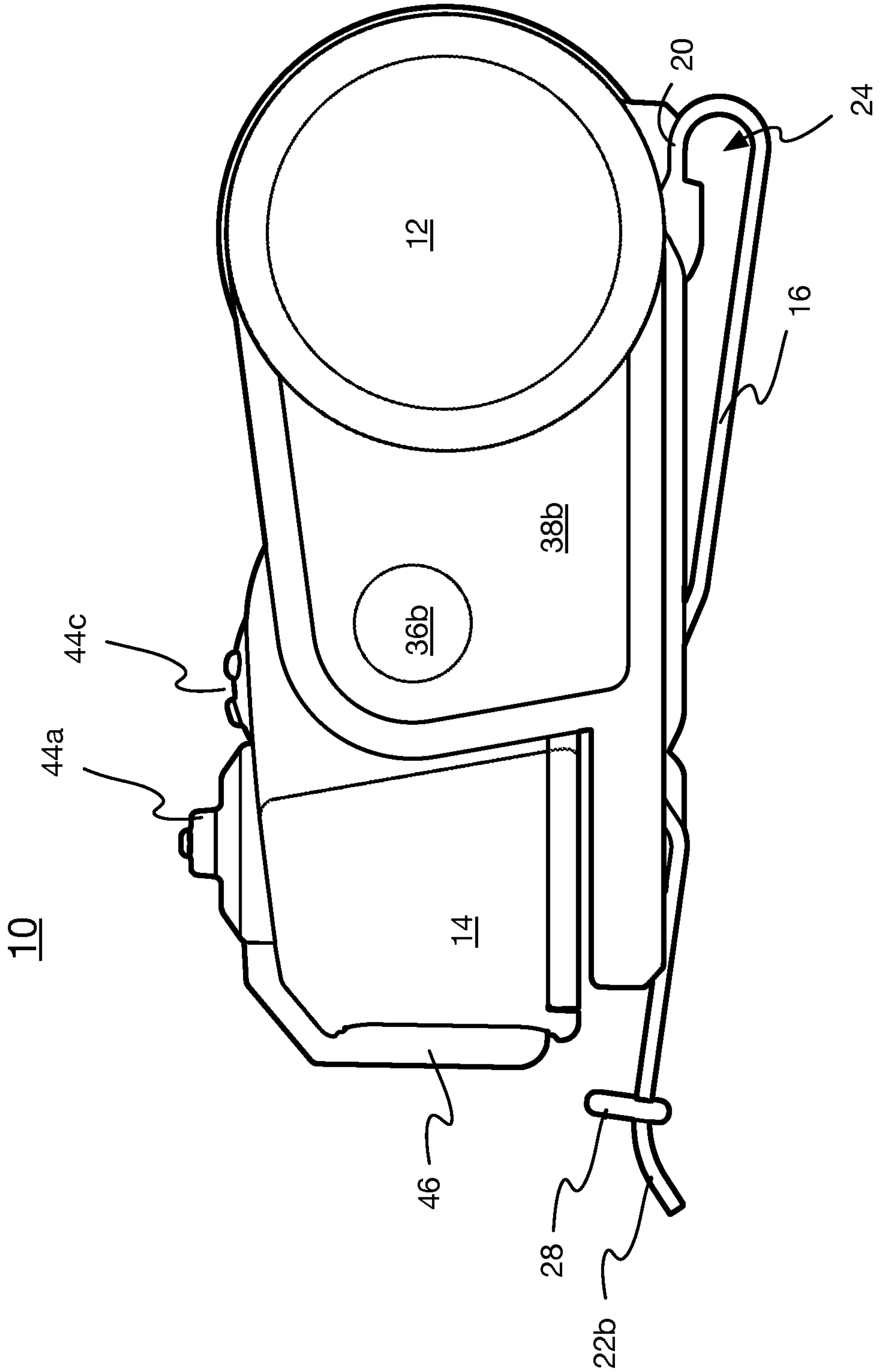
FIG. 6 is a left-side view of the frame illustrated in FIG. 1.
Figure 7:
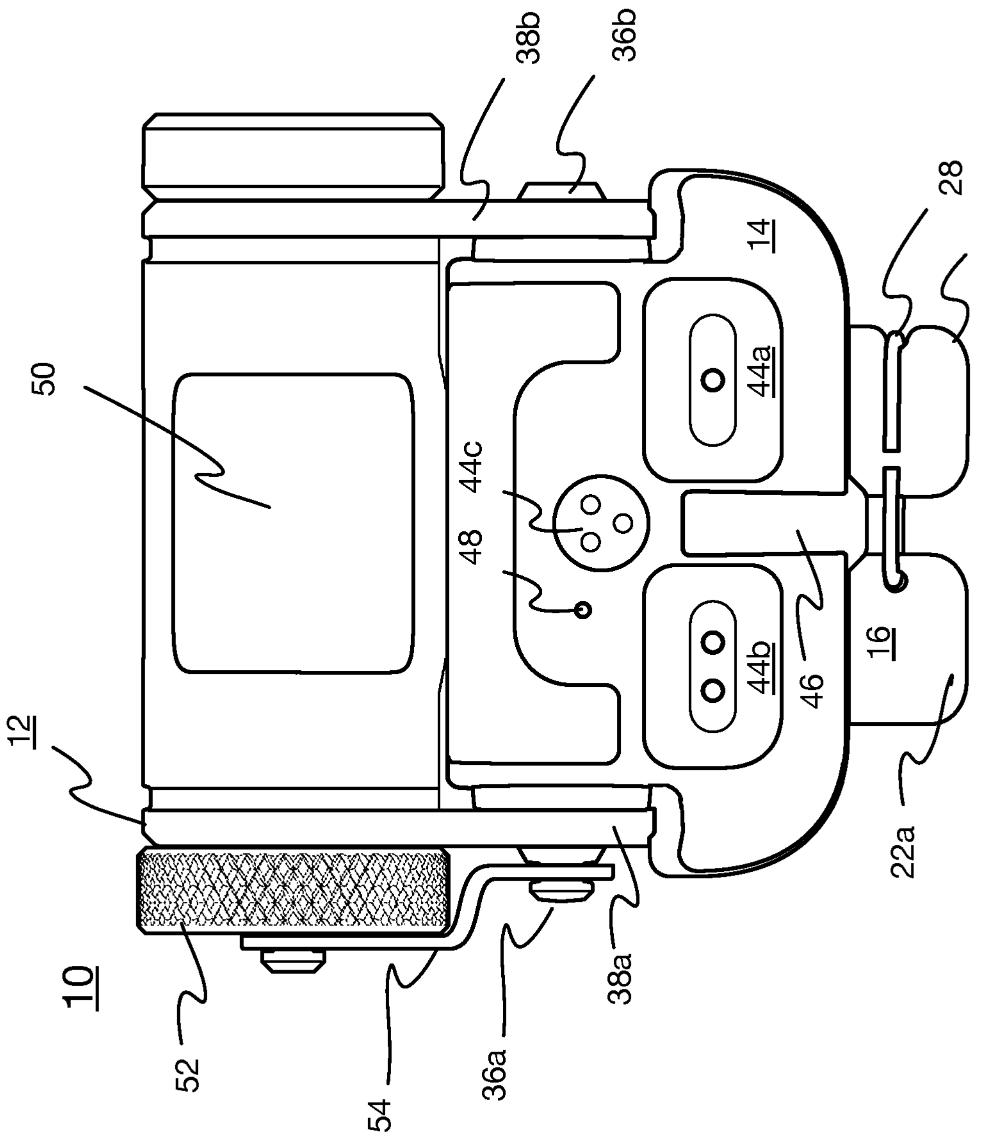
FIG. 7 is a top view of the frame illustrated in FIG. 1.
Figure 8:
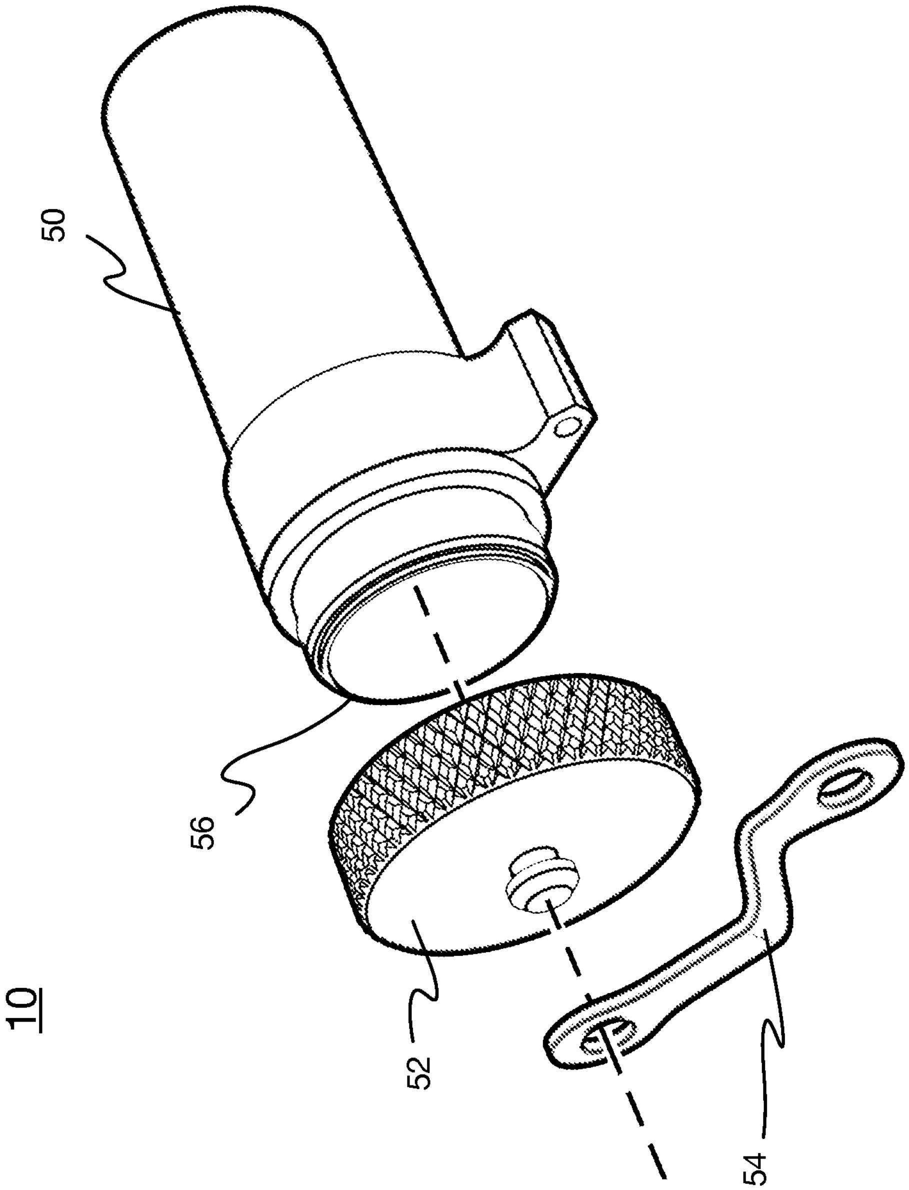
FIG. 8 illustrates aspects of the battery compartment for the frame illustrated in FIG. 1.
Figure 9:
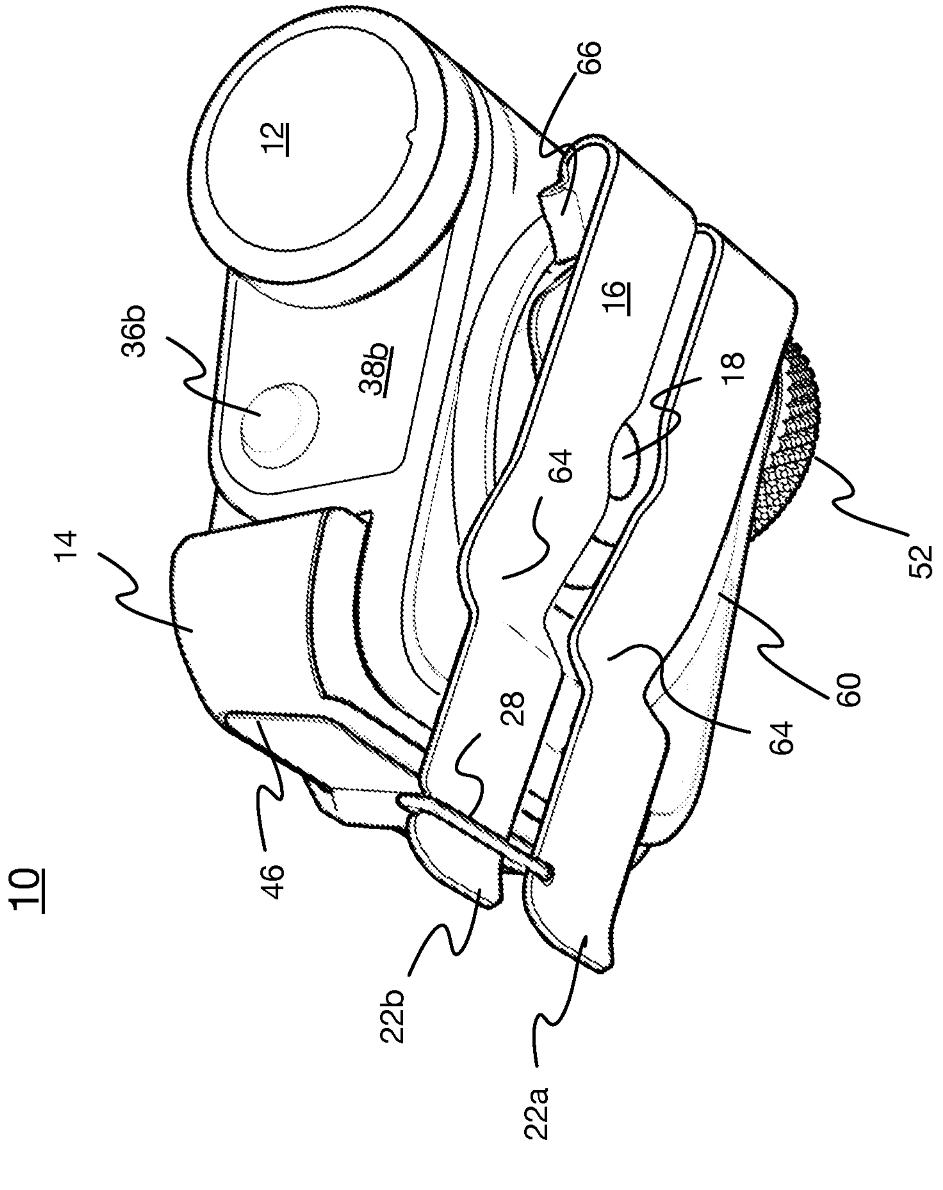
FIG. 9 is a bottom perspective view of the frame illustrated in FIG. 1 showing the gate in its closed position at one end of the longitudinal opening of the clip.

Described herein are examples of a frame having a clip for securing the frame to an article of clothing or other object. The frame includes a mount for receiving and supplying power to a removable, pivotable module. The clip is rotatably attached to the mount and rotatable through an arc of up to 360 degrees in a plane defined by a connection between a base portion of the clip and the mount. The clip includes a longitudinal opening for accommodating sewing ribs between portions of a webbing and a gate (which in one embodiment is a locking wire) rotatable between an open position and a closed position at one end of said longitudinal opening.

In the following description, the removable, pivotable module is described by way of example as an illumination module having one or more light sources. However, this is only for sake of convenience and explanation. The mount is configured to accommodate various kinds of modules, for example illumination modules, communication modules, audio/video player/recording modules, guidance modules, translator modules, etc., in complementary, bilateral pivot joints in arms of the mount. Thus, reference to an illumination module should be understood as being merely for convenience and not as a limitation of the present invention.

Referring now to FIGS. 1-14 in which like components are designated with like reference numbers, an example of a frame 10 configured in accordance with embodiments of the present invention is shown. Frame 10 includes a mount 12 for receiving and supplying power to a removable, pivotable module 14. A clip 16 is rotatably attached to the mount 12, e.g., by a pin 18, and is rotatable through an arc of up to 360 degrees in a plane defined by a connection between the clip and the mount. In the illustrated example, pin 18 secures a base portion 20 of the clip 16 to the frame 12 and the clip 16 is rotatable in a plane about an axis defined by (in this example orthogonal to) pin 18.

The clip 16 has a base portion 20 and a pair of elongated members 22*a*, 22*b*, where the elongated members are folded underneath the base portion, thereby defining a gap 24 between the base portion 20 and the elongated members 22*a*, 22*b* folded thereunder, which gap is configured to receive portions of a webbing or other article (e.g., a strap, a bill of a cap, a collar, cuff, or front placket of a shirt, an edge of a table, pedestal, or other surface, a bracket on a wall, ceiling, cockpit, or other surface, a belt, suspenders, or other article of clothing, or generally any convenient item which is stationary relative to the frame and of a size that can be accommodated in gap 24). The elongated members 22*a*, 22*b* are separated from one another by a longitudinal opening 26 (at least along a portion of their length) for accommodating sewing ribs between the portions of the webbing or other article, and a gate 28 is securably engaged to a first one of the elongated members 22*a*, 22*b* and is rotatable between an open position (see, e.g., FIG. 13) in which the gate does not obstruct the longitudinal opening 26 and a closed position (see, e.g., FIGS. 1-7, 9, 10, and 12) in which the gate obstructs the longitudinal opening.

In the illustrations, the gate 28 is a locking wire. When in its closed position, the locking wire, which is secured to elongated member 22*a* by passing through a hole 32 therein, removably engages elongated member 22*b* to obstruct the longitudinal opening 26, for example by removably engaging elongated member 22*b* at a recess 30 in a longitudinal outside edge of elongated member 22*b*. When in its open position, the locking wire 28 removably engages elongated member 22*a* at a recess 34 in a longitudinal outside edge of elongated member 22*a*. Thus, in addition to one of the elongated members securing at least one end of the locking wire, each respective one of the elongated members 22*a*, 22*b* may include a recess in a respective longitudinal outside edge thereof for removably engaging the locking wire. In other embodiments of the invention, the gate 28 may be a member that swings closed and open (e.g., about a pin securing it to one of the elongated members of the clip), obstructing the longitudinal opening 26 when in its closed position and not obstructing the longitudinal opening 26 when in its open position, or a cap that can be fitted cover the two ends of the elongated members 22*a*, 22*b* and obstruct the longitudinal opening 26 when it is in place. The cap may be securably attached to the clip 16 (or not) when it is not in use. Alternatively, the gate 28 may be a barrel bolt latch or a chain latch which obstructs the longitudinal opening 26 when in its closed position and does not obstruct the longitudinal opening 26 when in its open position.

As mentioned above the mount 12 is configured to receive and supply power to a removable, pivotable module 14. In the illustrated examples, module 14 is an illumination module and it is received in complementary, bilateral pivot joints in arms 38*a*, 38*b* of the mount 12. For example, the pivot joints may include pins 36*a*, 36*b* that mate with sockets 40*b* (referenced but hidden from view in FIG. 2) in module 14.

While the illustrated example of module 14 is an illumination module, in other embodiments different kinds of modules may be supported, e.g., communication modules, audio/video player/recording modules, guidance modules, translator modules, etc. The illustrated illumination module 14 includes a plurality of light sources 42*a*, 42*b*, 42*c*, each one independently operable via an associated one of a plurality of activation switches 44*a*, 44*b*, 44*c*. Each light source may be independently operable in a plurality of operation modes via an associated one of the activation switches. And, each light source may be disposed behind a protective cover 46 (e.g., a removable plastic cover/diffuser)
.

In one embodiment, light source 42*a* is one or more light emitting diodes (LEDs) that produce(s) white light and is activated by activation switch 44*a*. A single press and release of activation switch 44*a* turns the associated light source 42*a* on or off, and while light source 42*a* is on, depressing and holding activation switch 44*a* adjusts the brightness of light source 42*a*. In one embodiment, light source 42*b* is one or more LEDs that produce light at a wavelength compatible with night vision imaging systems and is(are) activated by activation switch 44*b*. A single press and release of activation switch 44*b* turns the associated light source 42*b* on or off, and while light source 42*b* is on, depressing and holding activation switch 44*b* adjusts the brightness of light source 42*b*. In one embodiment, light source 42*c* is one or more LEDs that produce(s) light at an infra-red wavelength and is(are) activated by activation switch 44*b*. A single press and release of activation switch 44*c* turns the associated light source 42*c* on or off. While light source 42*c* is on, depressing and holding activation switch 44*c* adjusts the brightness of light source 42*c*. While light source 42*c* is off, depressing and holding activation switch 44*c* activates light source 42*c* as an infra-red light beacon (e.g., for signaling others without being visible to humans). An indicator light 48 on top of the illumination module 14 indicates when the light source 42*c* is on. If light source 42*c* is on and either of activation switch 44*a* or 44*b* is depressed, light source 42*c* will be turned off. Pressing and holding both of activation switches 44*a* and 44*b* at the same time will lock or unlock, as appropriate, the illumination module 14. In the locked mode, none of the light sources will be activated by their associated activation switches. Only when the illumination module 14 is placed in its unlocked mode (by pressing and holding both of activation switches 44*a* and 44*b* at the same time) will the light sources be available to be activated by operation of their associated activation switches. As illustrated, the various illumination switches 44*a*, 44*b*, 44*c* may have different numbers of molded protuberances on their upper surfaces so that they can be readily distinguished from one another by an operator in the dark and/or without having to look at the device.

The frame 10 preferably includes a battery compartment 50 with a screwably-mounted cover 52. The screwably-mounted cover 52 may be affixed to the mount 12 with a securing lanyard 54, and in one embodiment a first end of the securing lanyard 54 by which the screwably-mounted cover 52 is affixed to the mount 12 is rotatably mounted to an arm 38*a* of the mount 12 at one of the pivot joints adapted to receive the removable, pivotable module 14, e.g., via pin 36*a*. The screwably-mounted cover 52 is adapted to engage a threaded sleeve 56 of the battery compartment 50. In other embodiments, the cover of the battery compartment may engage the battery compartment via a bayonet fitting or other fitting.

Figure 10:
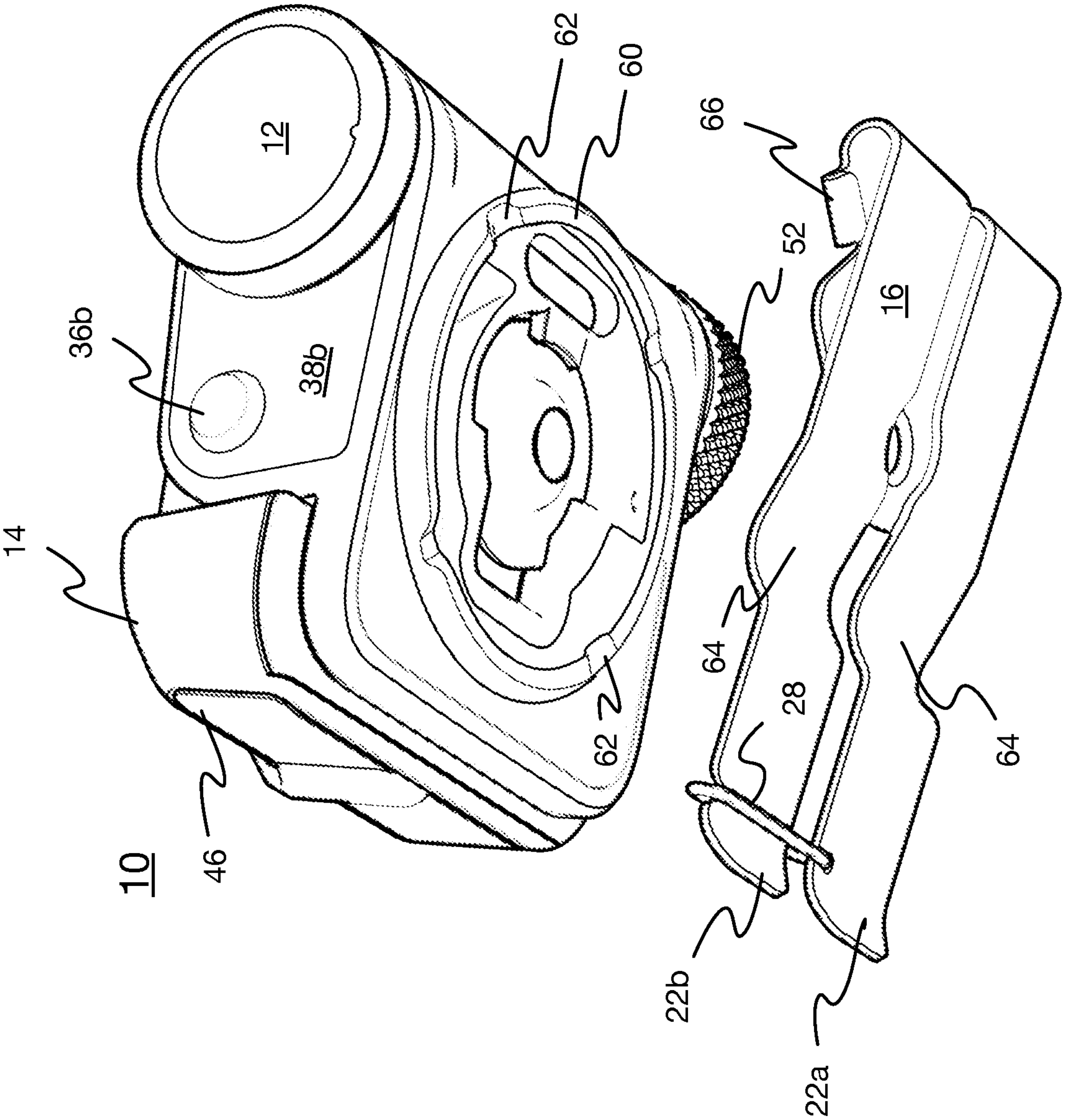
FIG. 10 is a bottom perspective view of the frame illustrated in FIG. 1 showing the clip separated from the mount.
Figure 11:
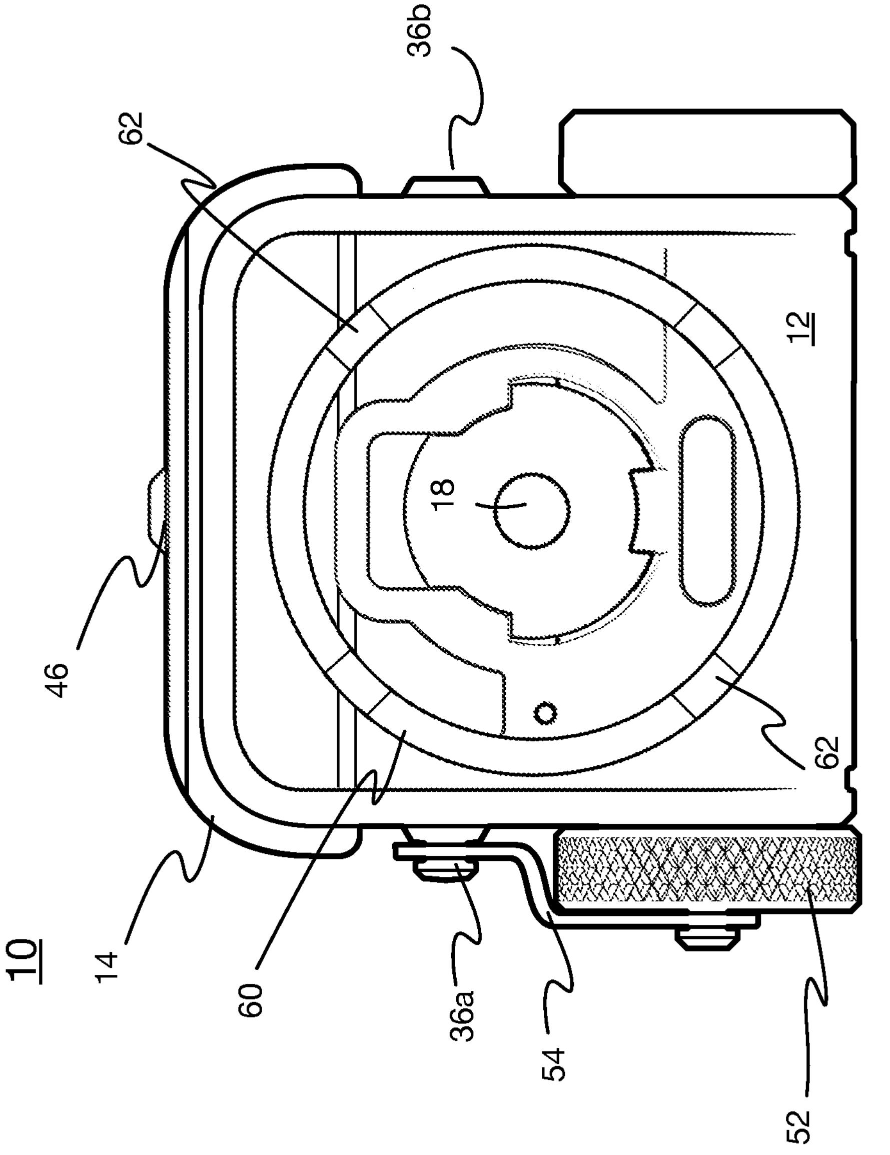
FIG. 11 is a bottom view of the frame illustrated in FIG. 1 showing the underside of the mount.
Figure 12:
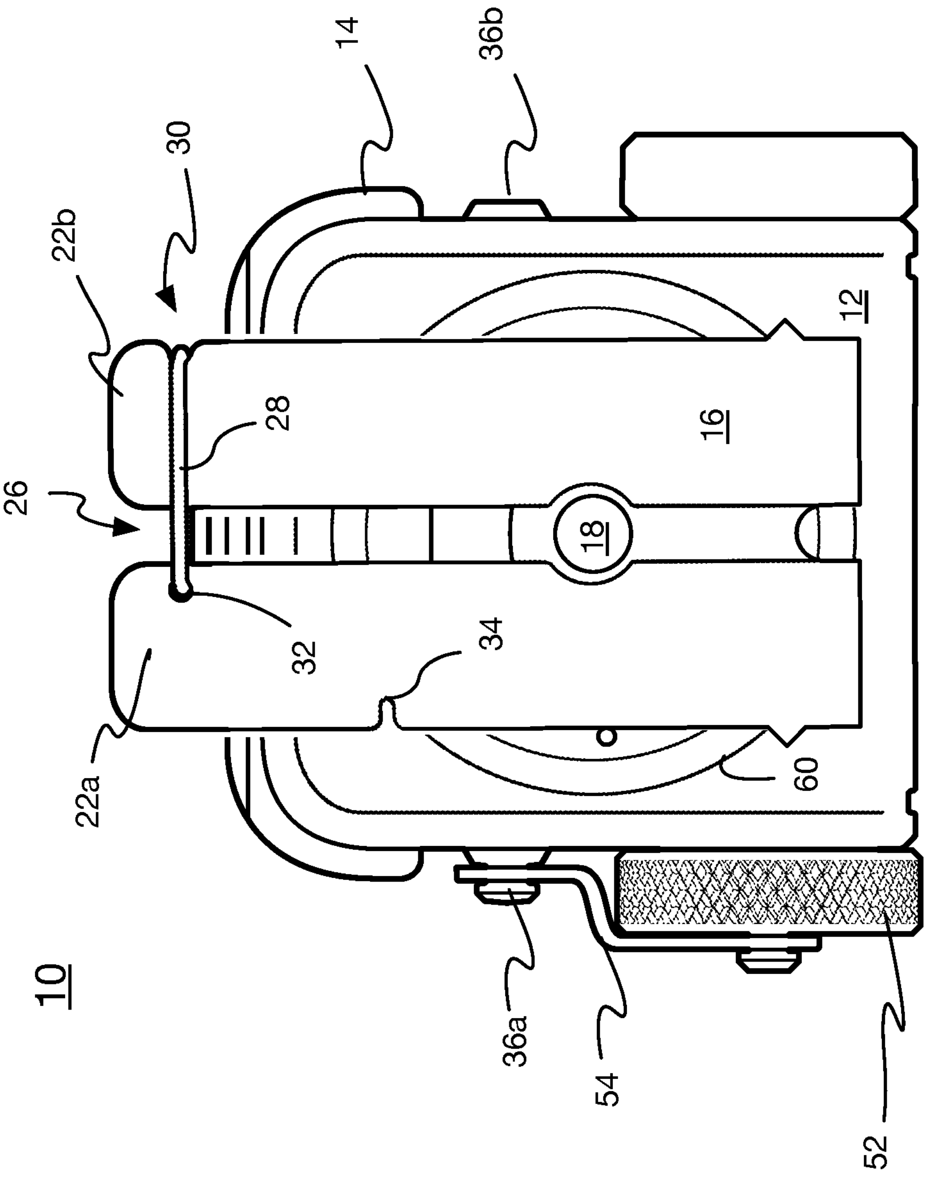
FIG. 12 is a bottom view of the frame illustrated in FIG. 1 showing the clip secured to the mount and the gate in its closed position at one end of the longitudinal opening.
Figure 13:
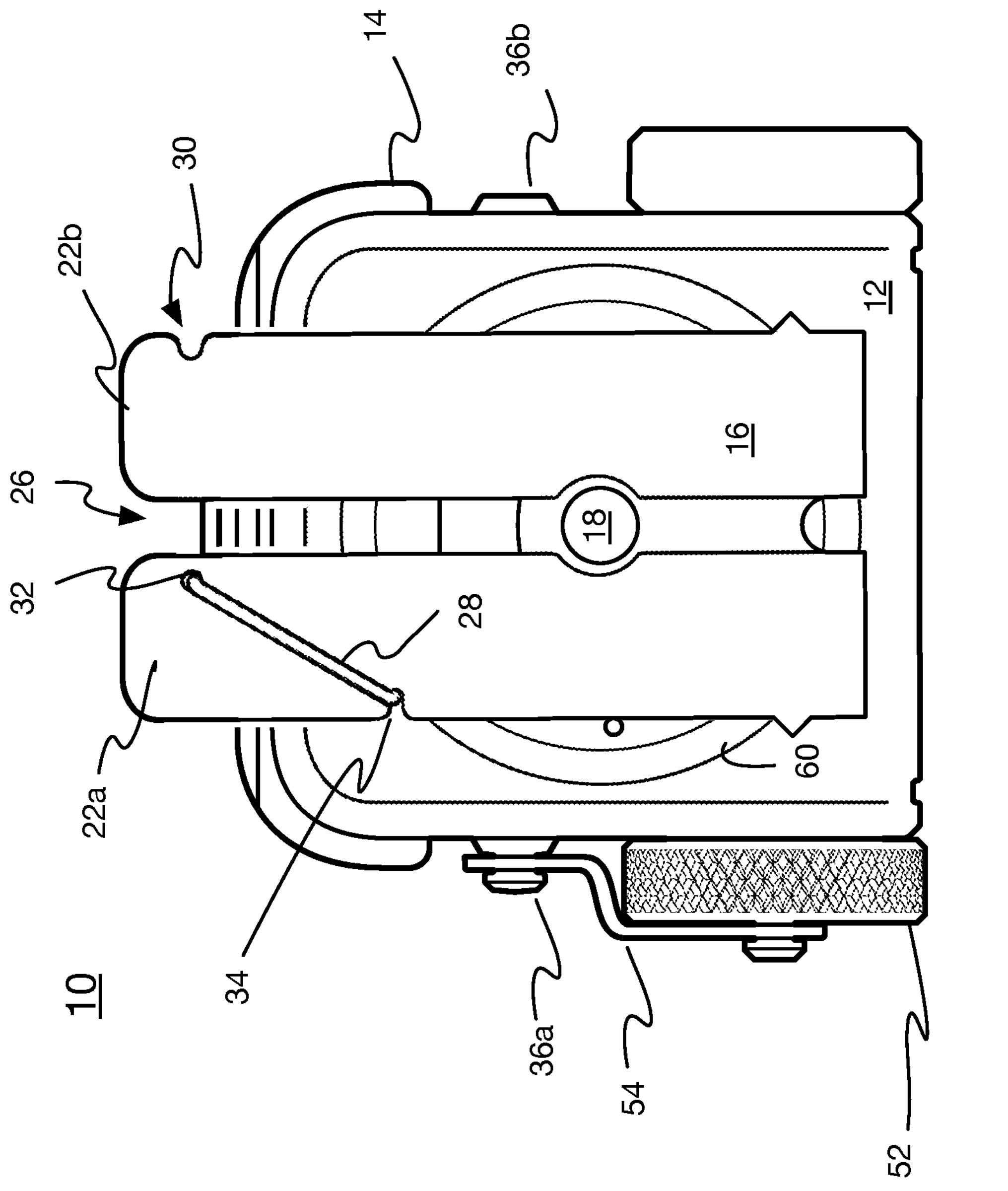
FIG. 13 is a bottom view of the frame illustrated in FIG. 1 showing the clip secured to the mount and the gate in its open position at one end of the longitudinal opening.
Figure 14:
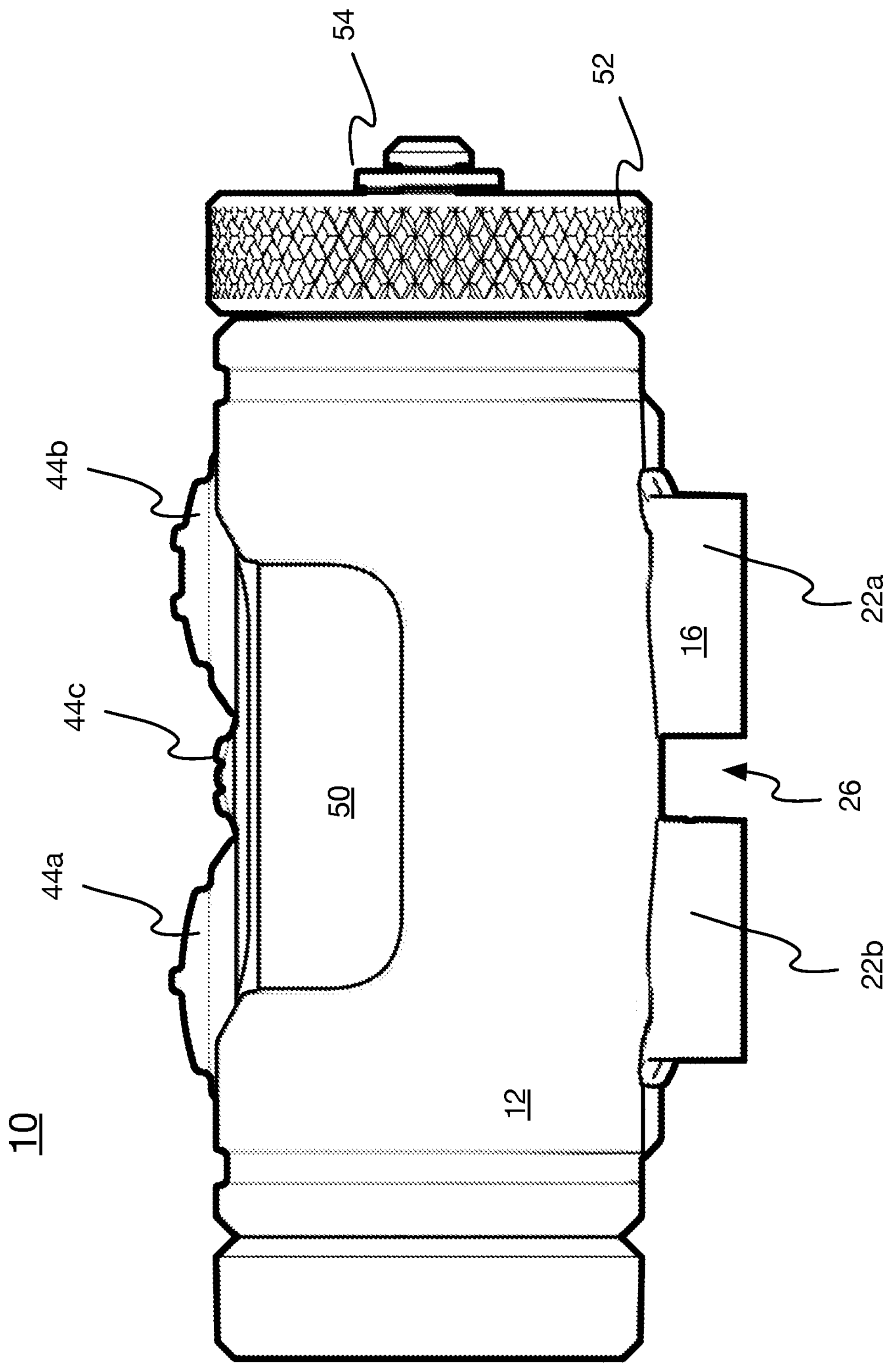
FIG. 14 is a back view of the frame illustrated in FIG. 1.

As indicated above, the clip 16 may be rotatably attached to the mount 12 by a pin 18, and, referring in particular to FIGS. 10 and 11, the mount 12 may include a rim 60 over which the clip 16 rotates. Such a rim 60 may include a plurality of detents 62 sized to accommodate one or more complementary projections 64, 66 of the clip 16 as it rotates through an arc of 360 degrees over the rim 60. For example, in one embodiment the rim 60 of the mount 12 over which the clip 16 rotates includes four detents 62 spaced 90 degrees from one another around the rim and the detents are sized to accommodate complementary projections 64, 66 of the clip 16 as it rotates over the rim through the 360 degree arc.

From the above it should be apparent that one embodiment of the invention provides an illumination device having a frame 10 with an illumination module 14 pivotably mounted within the frame and a clip 16 rotatably attached to the frame and rotatable through an arc of up to 360 degrees in a plane defined by a connection between the clip and the frame. The clip 16 has a pair of elongated members 22*a*, 22*b* folded beneath its base portion 20, thereby defining a gap 24 configured to receive portions of a webbing or other article. The elongated members 22*a*, 22*b* are separated from one another by a longitudinal opening 26 for accommodating sewing ribs between the portions of the webbing or other article, and a gate 28 (e.g. a locking wire) securably engaged to a first one of the elongated members 22*a* and rotatable between an open position in which the gate 28 does not obstruct the longitudinal opening 26 and a closed position in which the gate 28 obstructs the longitudinal opening 26. For those instances where the gate is a locking wire, when in the closed position, the locking wire may be secured to a first one of the elongated members 22*a* and removably engage a second one of the elongated members 22*b*, for example by removably engaging the second one of the elongated members at a recess 30 in a longitudinal outside edge of the second one of the elongated members. When in the open position, the locking wire may removably engage the first one of the elongated members 22*a* at a recess 34 in a longitudinal outside edge of the first one of the elongated members. Thus, each respective one of the elongated members 22*a*, 22*b* may include a recess 30, 34 in a longitudinal outside edge of the respective elongated member for removably engaging the locking wire.

The illumination module 14 may include one or more light sources 42*a*, 42*b*, 42*c*, for example a primary light source 42*a*, which may be an incandescent lamp but is preferably an LED, and one or more secondary light sources 42*b*, 42*c*, which likewise may be incandescent lamps but are preferably LEDs, arranged on either side of the primary light source. The secondary light sources are optional, and when present may be arranged in patterns on either side of the primary light source. In the illustrated embodiment, the secondary light sources 42*b*, 42*c*, are arranged on a single side of the primary light source 42*a* in linear alignment therewith along a horizontal axis of a light source array, but this is merely one example of a possible arrangement thereof. In some cases, the secondary light sources may be arranged in circular, arrow, or grid patterns on either or different sides of the primary light source. That is, some secondary light sources on one side of the primary light source may be arranged differently than other secondary light sources on the opposite side of the primary light source. Further, secondary light sources in addition to or in lieu of ones placed to the sides of the primary light source may be positioned above and/or below the primary light source.

The primary light source 42*a* and, when present, one or more of the secondary light sources 42*b*, 42*c*, preferably emit light in the visible light spectrum. Often, the primary light source will emit white light, but this is not necessarily so and instead the primary light source may emit light at other or additional wavelengths. Alternatively, the primary light source may emit white light, but an optional filter may be positioned thereover so as to allow only specific wavelengths to pass. Such a filter may be supported by a lip around the front of the light source.

One or more of the secondary light sources 42*b*, 42*c* may emit light in the ultra violet or infra-red spectrums. Such secondary light sources are useful, for example, when the illumination device is employed as a signaling mechanism and the wearer does not wish to divulge his/her position by emitting visible light which may be seen by others with the naked eye. It is contemplated that the primary light source may also emit light in the ultra violet or infra-red spectrums, but most often will be a source of white light or colored light. In some instances, the primary light source may be a dual- or multi-source LED with one emitter for white light and one or more separate emitters for non-white light, including but not limited to light outside of the visible spectrum.

At the front of light source array is a face plate or diffuser 46, which may include baffles for the various light sources. In some instances, the face plate may support irises for one or more of the light sources to allow control over the amount of light emitted. Also, the face plate may include a lens mount for the primary light source to allow for the placement of one or more lenses, filters, or covers.

At the rear of the frame is a screwably-mounted battery cover 52 and battery compartment 50. The illumination device is adapted to be powered by one or more alkaline, lithium ion, metal hydride, or other batteries. In one embodiment, a single AAA-size or AA-size alkaline battery may be used, but the use of replaceable batteries of other sizes or configurations is also contemplated. Batteries may be placed in/removed from the illumination device by unscrewing the battery cover 52, removing a used battery (if present) from the associated compartment 50, replacing it with a new or recharged battery, and then replacing the battery cover. While a screw fitting for the battery cover is preferred, other mounting arrangements, such as a bayonet fitting or a snap-top fitting may be used. All of the electronic circuitry for the illumination device is included within the confines of the illumination module 14 (which preferably is watertight) and power from the battery is provided via contact points on the pins 36*a*, 36*b* at the pivot joints on the mount 12.

Clip 16 is molded in the shape of an elongated "U", with a gap 24 between its base portion 20 and the elongated members 22*a*, 22*b* to receive a webbing, strap, bill of a cap, or other attachment means. While the clip 16 is preferably made of metal or other durable material, the mount 12 and modules 14 of the kind described herein may be fashioned from a variety of materials, including but not limited to plastics (e.g., zylonite), metals and/or metal alloys, cellulose acetates (including but not limited to nylon), carbon fiber, epoxy resins, and combinations of the foregoing. Fabrication processes for the mount, clip, and other components include, but are not limited to, injection molding, sintering, milling, and die cutting. Alternatively, or in addition, one or more additive manufacturing processes, such as extrusion, vat photopolymerization, powder bed fusion, material jetting, or direct energy jetting, may be used to fashion the illumination device and/or components thereof.

Illumination devices configured in accordance with embodiments of the present invention provide a relatively small (in terms of area being occupied), augmentative, illumination source that does not interfere with eye protection, loupes, masks, etc. when worn by a user. In addition to lighting, the present frame provides a platform for image and/or video capture and/or projection devices. For example, rather than or in addition to light sources, one or more cameras may be included in a module supported by the frame. Further, one or more microphones may be provided in place of or in addition to the light sources. Hands-free operation of the light sources, camera(s), and/or microphone(s) may be facilitated using voice activation.

As discussed above, the clip 16 may be swivelly attached to the mount 12. This allows the entire clip to be rotated with respect to the mount through an arc of up to 360 degrees in a plane defined by the connection between the clip and the mount. In the illustrated example, pin 18 secures the mount 12 to the clip 16 and the clip rotates in a plane orthogonal to and about the axis of pin 18. In general, any of a variety of swivel joints may be used for such a connection. For example, the clip may be fitted to the mount with a cylindrical post or pin, which post may turn freely or in a ratchet fashion, with respect to a receiving support structure in or on mount 12. A ratchet joint would allow the azimuthal direction of the clip with respect to the mount to be set without fear that it will easily deviate therefrom. The same may be accomplished using a snuggly fitting friction joint, for example as provided by overlapping, hollow cylindrical posts associated with the clip and mount that are prevented from coming apart by flanges on their ends. The rotating attachment of the clip and mount is optional but advantageous in certain applications of the device.

Devices configured in accordance with embodiments of the present invention are suitable for application in a variety of contexts, including military, law enforcement, consumer recreational, and others. Devices configured in accordance with embodiments of the present invention can be worn with or without a helmet, hat, or other headdress, and can also be attached to straps worn on a user's head, hand, or elsewhere, and can also be attached to nylon or other strap-like webbing. Such devices may also be secured to any convenient protruding edge of furniture or other articles.

Thus, frames having a mount for supporting various modules and having a clip for securing the frame to an article of clothing or other object have been described.

What is claimed is:

1. A retention device for securing an item to an article of clothing, said retention device comprising a pair of elongated members separated from one another by a longitudinal opening at least along a portion of their length, one of the elongated members having a gate operable to obstruct the longitudinal opening, wherein said elongated members are adapted for insertion in openings included in said article of clothing, said longitudinal opening is adapted for accommodating a portion of said article of clothing between said openings included in said article of clothing, and the gate is positionable to obstruct or not obstruct the longitudinal opening.

2. The retention device of claim 1, wherein at least one of the pair of elongated members includes a recess in a respective longitudinal outside edge thereof for removably engaging the gate.

3. The retention device of claim 1, wherein the gate is rotatable to obstruct or not obstruct the longitudinal opening.

4. The retention device of claim 1, further comprising a base portion, wherein the pair of elongated members extend from the base portion towards respective ends of the elongated members.

5. The retention device of claim 4, wherein a gap is formed by the pair of elongated members folding under the base portion.

6. The retention device of claim 1, wherein the gate is configured to securably engage a first one of the pair of elongated members and is rotatable between a first position in which the gate does not obstruct the longitudinal opening and a second position in which the gate does obstruct the longitudinal opening.

7. The retention device of claim 1, wherein the gate is configured to securably engage each of the pair of elongated members and is rotatable between a first position in which the gate does not obstruct the longitudinal opening and a second position in which the gate does obstruct the longitudinal opening.

8. The retention device of claim 1, wherein each of the elongated members includes a recess in a respective longitudinal outside edge thereof for removably engaging the gate.

9. The retention device of claim 1, wherein the gate is adapted to rotate about a position on the one of the elongated members.

10. A retention device for securing an item to webbing, said retention device comprising a pair of elongated members separated from one another by a longitudinal opening at least along a portion of their length, one of the elongated members having a gate operable to obstruct the longitudinal opening, wherein said elongated members are adapted for insertion in said webbing with a portion of said webbing accommodated in said longitudinal opening and the gate is positionable to obstruct or not obstruct the longitudinal opening.

11. The retention device of claim 10, wherein at least one of the pair of elongated members includes a recess in a respective longitudinal outside edge thereof for removably engaging the gate.

12. The retention device of claim 10, wherein the gate is rotatable to obstruct or not obstruct the longitudinal opening.

13. The retention device of claim 10, further comprising a base portion, wherein the pair of elongated members extend from the base portion towards respective ends of the elongated members.

14. The retention device of claim 13, wherein a gap is formed by the pair of elongated members folding under the base portion.

15. The retention device of claim 10, wherein the gate is configured to securably engage a first one of the pair of elongated members and is rotatable between a first position in which the gate does not obstruct the longitudinal opening and a second position in which the gate does obstruct the longitudinal opening.

16. The retention device of claim 10, wherein the gate is configured to securably engage each of the pair of elongated members and is rotatable between a first position in which the gate does not obstruct the longitudinal opening and a second position in which the gate does obstruct the longitudinal opening.

17. The retention device of claim 10, wherein each of the elongated members includes a recess in a respective longitudinal outside edge thereof for removably engaging the gate.

18. The retention device of claim 10, wherein the gate is adapted to rotate about a position on the one of the elongated members.

19. A retention device for securing an item to webbing, said retention device comprising a pair of elongated members separated from one another by a longitudinal opening at least along a portion of their length, a gate securable to each of the longitudinal members and operable to obstruct the longitudinal opening, wherein said elongated members are adapted for insertion in said webbing with a portion of said webbing accommodated in said longitudinal opening and the gate is positionable to obstruct or not obstruct the opening.

20. The retention device of claim 19, wherein the gate is rotatable between a first position in which the gate does not obstruct the longitudinal opening and a second position in which the gate does obstruct the longitudinal opening.

* * * * *